March 17, 1942.     E. B. LEAR     2,276,498
FASTENER
Filed Nov. 7, 1939
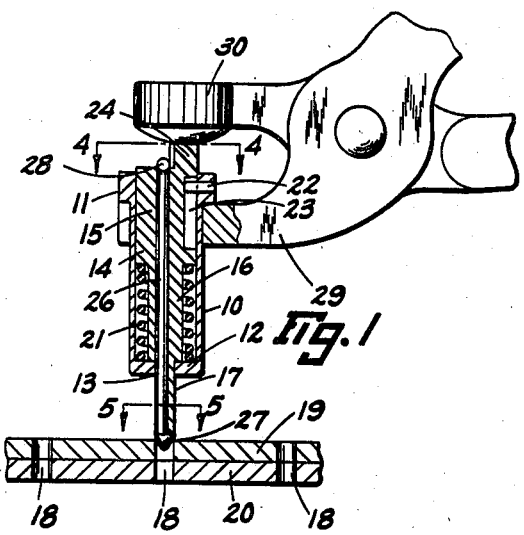
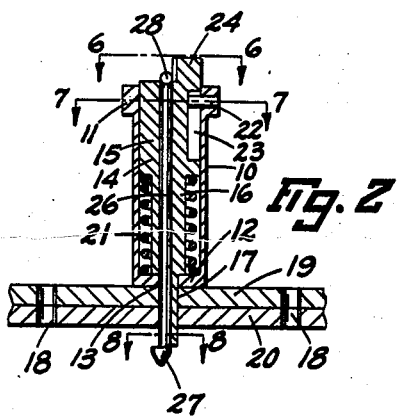
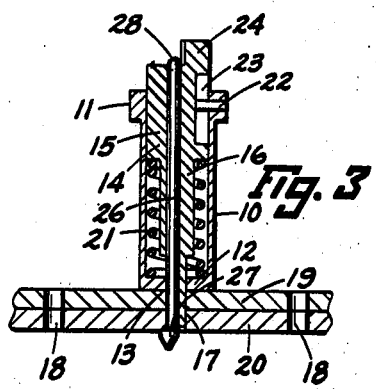
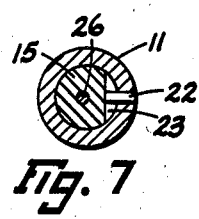
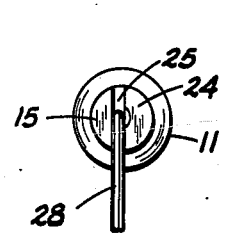
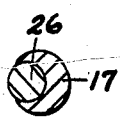
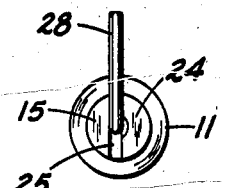
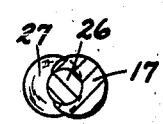
INVENTOR
*EARL B. LEAR*
BY
ATTORNEY Patented Mar. 17, 1942

2,276,498

UNITED STATES PATENT OFFICE 2,276,498

FASTENER

Earl B. Lear, Garfield Heights, Ohio, assignor to The Cleveland Pneumatic Tool Company, Cleveland, Ohio, a corporation of Ohio Application November 7, 1939, Serial No. 303,271

10 Claims. (Cl. 85—5)

This invention relates to a fastener for temporarily holding together perforated plates or sheets in perforate alignment preparatory to the riveting thereof.

One object of this invention is to produce a fastener or temporary rivet which may be readily applied to or removed from the work, and constituting a simple assembly which is strong, durable and efficient.

Another object of this invention is to produce an improved fastener capable of securing metal sheets together as well as assuring the perfect alignment of the rivet holes provided through the sheets.

Another object of this invention is to produce a temporary rivet which may be applied to and removed from the work from only one side thereof, thereby eliminating the assistance of another workman on the opposite side of the work.

Other objects and advantages more or less ancillary to the foregoing reside in the specific construction and aggroupment of the elements peculiar to this structure, as will become apparent from a more complete examination of this specification.

In the drawing, which illustrates the invention:

Fig. 1 is a side elevational sectional view of the improved fastener together with a portion of the tool with which the fastener is applied to or removed from the work. In this view, the fastener is shown in the position assumed during the first step of its application to the work.

Fig. 2 is a view similar to Fig. 1 illustrating the position assumed by the fastener during the second step of its application to the work.

Fig. 3 is a view similar to Fig. 1 showing the fastener in operative position.

Fig. 4 is a top plan view looking in the direction of the arrows 4—4 in Fig. 1.

Fig. 5 is an enlarged cross sectional view taken in a plane indicated by line 5—5 in Fig. 1.

Fig. 6 is a top plan view looking in the direction of the arrows 6—6 in Fig. 2.

Fig. 7 is a cross sectional view taken in a plane indicated by line 7—7 in Fig. 2.

Fig. 8 is an enlarged cross sectional view taken in a plane indicated by line 8—8 in Fig. 2.

Referring to the drawing in which like symbols designate corresponding parts throughout the several views, 10 represents a cup-shaped cylindrical housing formed on its upper end with an external annular flange 11 and at its other end by a cross wall or base 12 having a central bore 13 extending therethrough. Slidable in the housing 10, there is a rod 14 of differential diameters including a head 15 fitting closely within the housing 10, a central reduced portion 16, and a small extreme end portion 17 slidable through the bore 13 of the housing-base 12, which base relative to the rod 14 forms a projecting member extending transversely from the rod. The diameter of this last portion 17 is calculated to be about equal or slightly smaller than that of the rivet holes 18 provided through the work represented in the drawing by an upper sheet 19 and a lower sheet 20. Interposed between the head 15 of the rod 14 and the base 12 of the housing 10, there is a compression spring 21 constantly urging the rod upwardly relative to the housing 10. The upward movement of the rod is limited by a key 22 fixed within the annular flange 11 and radially extending into a longitudinally disposed groove 23 formed in the head 15 of the rod. The length of the groove 23 is such that its lower end will engage the key to limit the upward movement of the central portion of the rod when the lower end of the rod is substantially flush with the base 12 of the housing 10. In other words, the length of the groove 23 is calculated to enable the slidable movement of the housing base 12 relative to the rod 14 substantially up to the free end of the rod's small portion 17. The key 22 located within the groove 23 also prevents rotation of the rod relative to the housing 10. The head 15 of the rod 14 extends beyond the upper end of the housing 10 where it is provided with a step 24 and at the base of said step with a diametrically extending shallow groove 25 parallel to the inner face of the step 24.

Extending longitudinally through the rod 14 eccentrically relative to the smaller portion 17 thereof, there is a rotatable stem 26 terminated at its lower end by an integral tip 27 protruding laterally of the stem for engagement with the end of the rod's reduced portion 17, the diameter of the tip being equal to that of the portion 17. The stem also extends beyond the upper end of the rod 14, where it is bent at right angle to form a handle 28 adapted to fit within the groove 25 and capable of rotation within an arc of 180°, the step 24 acting as a stop against further rotation of the handle 28. The relation of the handle 28 to the tip 27 is such that when the handle is positioned as shown in Fig. 4, the tip is located coaxially with the small portion 17 of the rod 14, and since the diameter of the tip is equal to that of the portion 17, the marginal edge of the tip coincides with that of the portion 17 as shown in Fig. 5. When the handle 28 is rotated 180° into the position shown in Fig. 6, the tip 27 extends laterally from the small end of the rod 14 as shown in Fig. 8, in which instance a portion of the tip 27 overlaps the end of the small portion 17 of the rod 14, as shown in dotted lines in Fig. 8, to prevent upward movement of the stem relative to the rod.

The temporary rivet or fastener is applied to the work by using a plier-like tool having a jaw 29 engaging the underside of the annular flange 11 of the housing 10 and another jaw 30 engaging the extreme upper end of the rod 14. Upon movement of the two jaws toward each other, the rod 14 will be forced into the housing 10 against the action of the compression spring 21 until the lower end of the rod's portion 16 engages the base 12 of the housing 10 as shown in Fig. 1, thereby causing the entire small rod portion 17 to protrude from the housing-base 12. In this instance, the stem 26 carried by the rod 14 and held against longitudinal movement relative thereto by the engagement of the tip 27 and handle 28 with the ends of the rod will of course move with the rod relative to the housing 10. With the stem's handle 28 positioned as shown in Fig. 4, and the consequential position of the tip 27 in coaxial alignment with the small end portion 17 of the rod 14 as shown in Figs. 1 and 5, the rod, or more particularly its small end portion 17 together with the tip 27 of the stem 26 may be inserted through substantially aligned perforations 18 of the sheets 19 and 20. The diameter of the rod's portion 17 being substantially equal to that of the perforations, that portion of the rod will act as a drift pin for maintaining the sheets in perfect perforate alignment. Subsequently, the stem's handle 28 may be rotated into the position shown in Fig. 6, in which instance the handle will snap out of the adjacent end portion of the groove 25 to again drop into the diametrically opposed end portion thereof after a rotation of about 180°, thereby causing, upon rotation of the stem 26, the tip 27 to extend laterally of the rod's portion 17 as shown in Figs. 2, 3 and 8. After releasing the pressure exerted on the annular flange 11 of the housing 10 and on the upper end of the stem 14 by the plier-like tool partly shown in Fig. 1, the compression spring 21 active between the base 12 of the housing 10 and the head 15 of the rod 14, will cause upward movement of the rod 14 and stem 26 relative to the housing 10, resulting in the clamping action of the work or sheets 19 and 20 between the housing-base 12 and the now laterally extending tip 27 of the stem 26, which engages the lower face of the lower plate 20.

After the sheets have been riveted together, the temporary rivet may be removed from the work by again compressing the spring 21 through the plier-like tool partly shown in Fig. 1, thereafter the stem 26 may again be rotated into the position shown in Fig. 1 and the temporary rivet removed from the work.

From the foregoing explanation, it will be understood that through the handle 28 it is possible to rotate the stem 26 with one hand while holding the assembly in compressed condition with the other hand through the plier-like tool shown in Fig. 1. The pin being mounted eccentrically relative to the center axis of the rod's portion 17 will upon its rotation cause the tip 27 to move laterally of the rod for engagement with the underside of the work. The compression spring 21 is of course calculated to create a sufficient clamping action between the lower end of the housing 10 and the tip 27 of the stem 26 for maintaining the plates 19 and 20 together in perfect perforate alignment.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A fastener for temporarily holding together at least two perforated sheets in superposed position, including a rod, a rotatable stem extending through said rod against longitudinal movement relative thereto, an integral enlarged eccentrically disposed tip at the lower end of said stem below one end portion of said rod, said tip upon the rotation of said stem being movable into or out of the peripheral limit of said one end portion of said rod, a member including a wall extending transversely from said rod and slidable with respect thereto substantially up to the junction of said tip with said stem, and a compression spring active on said member for constantly urging said wall toward said tip.

2. A fastener for temporarily holding together at least two perforated sheets in superposed position, including a rod formed with a reduced end portion, a rotatable stem extending through said rod, an enlarged tip at the extremity of said rod's reduced end portion, said tip being an integral eccentrically disposed part of said stem and capable of rotation into or out of the peripheral limit of said rod's reduced end portion, a member including a wall extending transversely from said rod and slidable with respect thereto substantially up to the junction of said tip with said stem, and a compression spring active on said member constantly urging said wall toward said tip.

3. A fastener for temporarily holding together at least two perforated sheets in superposed position, including a cup shaped member having a bottom wall adapted to rest on the upper sheet, a central opening through said bottom wall, a rod within said member, a rotatable stem in said rod, said rod and stem having end portions extending through said opening, said stem having an integral enlarged eccentrically disposed tip on its end portion below the adjacent end of said rod, the end portions of said rod and stem together with said tip when disposed in one position being insertable through aligned perforations of said sheets, said tip upon rotation of said stem being capable of extending laterally of said end portion of said rod for engagement with the underside of the lower sheet, and a compression spring active between said member and rod constantly urging said rod upwardly relative to said member, said rod engaging said stem for transmitting the upward thrust of the rod to the stem and effecting clamping of the sheets between said member and the tip of said stem.

4. A fastener for temporarily holding together at least two perforated sheets in superposed position, including a cup shaped member having a bottom wall adapted to rest on the upper sheet, a central opening through said bottom wall, a slidable rod within said member, a stem rotatably carried by said rod for slidable movement therewith, said rod and stem having end portions extending through said opening, said stem having an integral enlarged eccentrically disposed tip on its end portion below the adjacent end of said rod, said tip by virtue of the rotation of said stem being positionable in alignment with the end portion of said rod for insertion therewith through aligned perforations of said sheets and out of alignment with the end portion of the rod for engagement with the underside of the lower sheet, and a compression spring active between said member and rod constantly urging said rod and tip upwardly for clamping the sheets between said member and tip.

5. A fastener for temporarily holding together at least two perforated sheets in superposed position, including a cup shaped member having a bottom wall adapted to rest on the upper sheet, a central opening through said bottom wall, a slidable rod within said member, a stem rotatably carried by said rod for slidable movement therewith, said rod and stem having end portions extending through said opening, said stem having an integral enlarged eccentrically disposed tip on its end portion below the adjacent end of said rod, said tip being of a diameter substantially equal to that of the end portion of said rod and when disposed in one position being insertable therewith through aligned perforations of said sheets, said tip upon the rotation of said stem being capable of extending laterally from the end portion of said rod for engagement with the underside of the lower sheet, and a compression spring active between said member and rod constantly urging said rod and tip upwardly for clamping the sheets between said member and tip.

6. A fastener for temporarily holding together at least two perforated sheets in superposed position, including a hollow sheet engaging member having a transverse wall adapted to rest on the upper sheet, an opening through said wall, a rod slidably carried by said member, a stem rotatably carried by said rod for slidable movement therewith, said rod and stem having adjacent end portions extending through said opening, an enlarged eccentrically disposed tip integral with said stem terminating the end portion thereof and insertable in one position with said end portion of said rod through aligned perforations of said sheets, said tip upon the rotation of said stem being capable of extending laterally of said rod for engagement with the underside of the lower sheet, and a spring active between said member and rod constantly urging said rod and tip upwardly for clamping the sheets between said member and tip.

7. A fastener for temporarily holding together at least two perforated sheets in superposed position, including a hollow sheet engaging member having a transverse wall adapted to rest on the upper sheet, an opening through said wall, an axially movable rod carried by said member, a stem rotatably carried by said rod, said rod and stem having adjacent end portions extending through said opening, means securing said stem against axial movement relative to said rod including an integral enlarged eccentrically disposed tip on the end portion of said stem engaging said end portion of said rod, said tip and end portions in one relative position being insertable through aligned perforations of said sheets, said tip upon the rotation of said stem being capable of extending laterally of the end portion of said rod for engagement with the underside of the lower sheet, and means between said member and rod for effecting axial movement of the latter relative to the former.

8. A fastener for temporarily holding together at least two perforated sheets in superposed position, including a rod having a bore extending longitudinally therethrough, a stem journaled in said bore, said rod and stem having adjacent end portions of a combined cross sectional area substantially equal to that of the perforations through said sheets, an enlarged tip integral with and eccentrically disposed on said stem terminating the aforesaid end portion thereof and located below the end portion of said rod, said tip and end portions in one relative position being insertable through aligned perforations of said sheets to maintain said perforations in alignment, said tip upon rotation of said stem being capable of extending laterally of the end portion of said rod for engagement with the underside of the lower sheet, a member formed with a wall extending transversely from said rod and slidable with respect thereto substantially up to the junction of said tip with said stem, said wall being adapted to rest on the upper sheet, and means between said rod and member for clamping the sheets between said tip and wall.

9. A fastener for temporarily holding together at least two perforated sheets in superposed position, including a rod, a rotatable stem extending through said rod, means securing said stem against longitudinal movement relative to said rod including an integral enlarged eccentrically disposed tip at the lower end of said stem engaging the lower end of said rod, said tip upon rotation of said stem being movable into or out of the peripheral limit of the lower end of said rod, a member including a wall extending transversely from said rod and slidable with respect thereto substantially up to the junction of said tip with said stem, and means between said member and rod for effecting relative slidable movement therebetween.

10. A fastener for temporarily holding together at least two perforated sheets in superposed position, including a pair of elongated substantially cylindrical elements mounted one within the other for rotation relative to one another, means securing said elements against relative longitudinal movement including an integral enlarged eccentrically disposed tip at one end of one of said elements engaging the adjacent end of the other element, said tip upon said relative rotation being movable into or out of the peripheral limit of said adjacent end, a member including a wall extending transversely from said elements and slidable with respect thereto substantially up to said tip where it engages said adjacent end of said other element, and means between said member and one of said elements for effecting relative slidable movement therebetween.

EARL B. LEAR.